United States Patent
Rofougaran

(10) Patent No.: US 8,063,769 B2
(45) Date of Patent: Nov. 22, 2011

(54) DUAL BAND ANTENNA AND METHODS FOR USE THEREWITH

(75) Inventor: Ahmadreza Reza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 318 days.

(21) Appl. No.: 12/210,318

(22) Filed: Sep. 15, 2008

(65) Prior Publication Data

US 2009/0073070 A1   Mar. 19, 2009

Related U.S. Application Data

(63) Continuation-in-part of application No. 11/867,763, filed on Oct. 5, 2007.

(60) Provisional application No. 60/921,221, filed on Mar. 30, 2007, provisional application No. 60/932,411, filed on May 31, 2007.

(51) Int. Cl.
   *G08B 1/08* (2006.01)

(52) U.S. Cl. ............... 340/539.1; 340/572.7; 340/568.1

(58) Field of Classification Search ............... 340/572.1, 340/572.4, 572.7, 571, 568.1, 539.11, 539.1, 340/10.1; 343/700 MS, 743, 786, 793, 895, 343/819; 455/41.1
   See application file for complete search history.

(56) References Cited

U.S. PATENT DOCUMENTS

| | | | |
|---|---|---|---|
| 7,196,666 B2 * | 3/2007 | Allen et al. | 343/700 MS |
| 7,262,740 B2 * | 8/2007 | Tikhov et al. | 343/770 |
| 7,423,606 B2 * | 9/2008 | Knadle et al. | 343/819 |
| 7,616,165 B2 * | 11/2009 | Tammisetti et al. | 343/786 |
| 7,664,461 B2 * | 2/2010 | Rofougaran et al. | 455/41.1 |
| 7,750,813 B2 * | 7/2010 | Deavours et al. | 340/572.7 |
| 7,761,078 B2 * | 7/2010 | Bhagat et al. | 455/333 |
| 2006/0066441 A1 | 3/2006 | Knadle, Jr. et al. | |
| 2006/0267733 A1 | 11/2006 | Steinke et al. | |
| 2008/0054638 A1 * | 3/2008 | Greene et al. | 290/1 R |

* cited by examiner

*Primary Examiner* — Van T. Trieu
(74) *Attorney, Agent, or Firm* — Garlick, Harrison & Markison; Bruce E. Stuckman

(57) ABSTRACT

A dual band antenna includes a far field antenna structure for facilitating the communication of first data with a remote device via far field signaling in a millimeter wave band. A near field antenna structure facilitates the communication of second data with a remote device via near field signaling in a near field band. The far field antenna structure and the near field antenna structure share at least one common antenna element.

18 Claims, 14 Drawing Sheets

DUAL BAND ANTENNA AND METHODS FOR USE THEREWITH

CROSS REFERENCE TO RELATED PATENTS

This US patent application is a continuation-in-part of the copending U.S. patent application entitled, "Multi-Mode RFID Reader Architecture," having Ser. No. 11/867,763, filed on Oct. 5, 2007 which itself claims priority 35 USC §119 to a provisionally filed patent application entitled, "RFID System," having a provisional filing date of Mar. 30, 2007, and a provisional application Ser. No. 60/921,221 and to a provisionally filed patent application entitled, "RFID System," having a provisional filing date of May 31, 2007, and a provisional Ser. No. 60/932,411.

The patent application is further related to the following co-owned U.S. patent application:
Transceiver with Far Field and Near Field Operation and Methods for Use Therewith, having Ser. No. 12/210,303, and filed on Sep. 15, 2008;
the contents of which are incorporated herein by reference thereto.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification or other data for use in identifying a person, item, pallet or other object or data related to a characteristic of a person, item, pallet or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded data stored in the RFID tag. The RFID reader decodes the coded data to identify or determine the characteristics of a person, item, pallet or other object associated with the RFID tag. For passive tags, the RFID reader also generates an unmodulated, continuous wave (CW) signal to activate and power the tag during data transfer.

RFID systems typically employ either far field or near field technology. In far field technology, the distance between the RFID reader and the tag is great compared to the wavelength of the carrier signal. Typically, far field technology uses carrier signals in the ultra high frequency or microwave frequency ranges. In far-field applications, the RFID reader generates and transmits an RF signal via an antenna to all tags within range of the antenna. One or more of the tags that receive the RF signal responds to the reader using a backscattering technique in which the tags modulate and reflect the received RF signal.

In near-field technology, the operating distance is usually less than one wavelength of the carrier signal. Thus, the reading range is approximately limited to 20 cm or less depending on the frequency. In near field applications, the RFID reader and tag communicate via electromagnetic or inductive coupling between corresponding reader and tag coil antennas. Typically, the near field technology uses carrier signals in the low frequency range.

The International Organization for Standardization (ISO) has developed an RFID standard called the ISO 18000 series. The ISO 18000 series standard describes air interface protocols for RFID systems especially in applications used to track items in a supply chain. The ISO 18000 series has seven parts to cover the major frequencies used in RFID systems around the world. The seven parts are:
18000-1: Generic parameters for air interfaces for globally accepted frequencies;
18000-2: Air interface for below 135 KHz;
18000-3: Air interface for 13.56 MHz;
18000-4: Air interface for 2.45 GHz;
18000-5: Air interface for 5.8 GHz;
18000-6: Air interface for 860 MHz to 930 MHz;
18000-7: Air interface at 433.92 MHz.

According to the ISO 18000-2 and 18000-3 parts of the ISO 18000 series, near-field technology with magnetic/inductive coupling has an air interface protocol at low frequency (LF) of 135 KHz or less or at 13.56 MHz high frequency (HF). The communication protocol used by the reader and the tag is typically a load modulation technique.

Far field technology with RF coupling has three ISO defined air interfaces at 2.45 GHz microwave frequency according to ISO 18000-5, 860 MHZ to 930 MHz ultra high frequency (UHF) range according to ISO 18000-6 and 433.92 MHz UHF according to ISO 18000-7. For UHF at 860-930 MHz, the ISO 18000-6 has defined two tag types, Type A and Type B with a reader to tag link defined as including either 33 kbps or 40 kbps data rate, Amplitude Shift Keying (ASK) modulation, and biphase-space (FM0) encoding of data.

In addition, the EPCglobal Class 1, Generation 2 standard defines a tag standard using UHF with a tag to reader link of 40 to 640 kbps, ASK or Phase Shift Keying (PSK) modulation and data encoding of biphase space (FM0) or Miller-modulated subcarrier.

Generally, RFID readers employing near field technology operating at LF or HF have been used in applications involving reading item-level tagging for inventory control in the supply chain management or applications involving short range reads such as smart cards or vicinity credit cards, e.g. for access control or monetary use, passports, money bills authentication, bank documents, etc. Such applications do not need long range reads of the tags but may need more security provided by near field technology. In addition, near field technology is known for better performance for reading of tags near fluids, such as fluid medications, wherein far field RF coupling tends to incur interference from the fluids.

RFID readers employing far field technology RF coupling at microwave or UHF have been used to read tags in applications involving shipping units such as pallets or carton level tracking or other applications needing long-distance reads.

Currently, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field), but not in both. These different types of technology and the number of different RFID standards, each defining a different protocol for enabling communication between the reader and the tag, has inhibited the wide spread use of RFID readers for multiple applications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF EMBODIMENTS OF THE INVENTION

Figure 1:
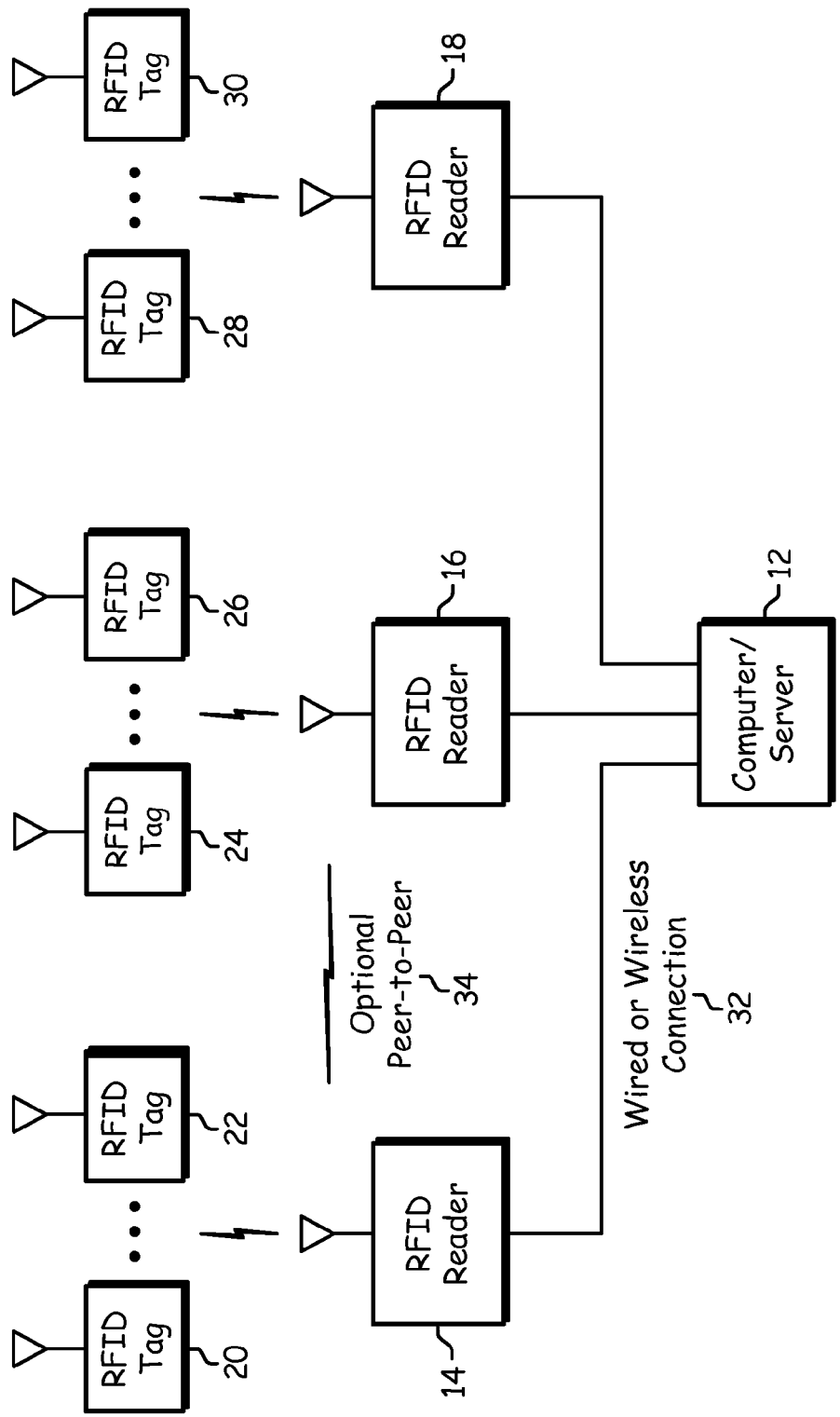
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, communication applications, security applications, tracking inventory, tracking status, location determination, assembly progress, or et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In far field mode of operation, the RF communication scheme between the RFID readers 14-18 and RFID tags 20-30 is a backscatter coupling technique using far field technology whereby the RFID readers 14-18 request data from the RFID tags 20-30 via an RF signal, and the RF tags 20-30 respond with the requested data by modulating and backscattering the RF signal provided by the RFID readers 14-18. In a near field mode of operation, the RF communication scheme between the RFID readers 14-18 and RFID tags 20-30 is a magnetic or inductive coupling technique whereby the RFID readers 14-18 magnetically or inductively couple to the RFID tags 20-30 to access the data on the RFID tags 20-30. Thus, in one embodiment of the current invention, the RFID readers 14-18 may communicate in a far field mode to an RFID tag 20-30 with far field mode capabilities and in a near field mode to an RFID tag 20-30 with near field mode capabilities.

The RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag 20-30 can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

In other embodiments, the RFID system of FIG. 1 may be expanded to include a multitude of RFID readers 14-18 distributed throughout a desired location (for example, a building, office site, et cetera) where the RFID tags 20-30 may be associated with access cards, smart cards, mobile phones, personal digital assistants, laptops, personal computers, inventory items, pallets, cartons, equipment, personnel, et cetera. In addition, it should be noted that the computer/server 12 may be coupled to another server and/or network connection to provide wide area network coverage.

Figure 2:
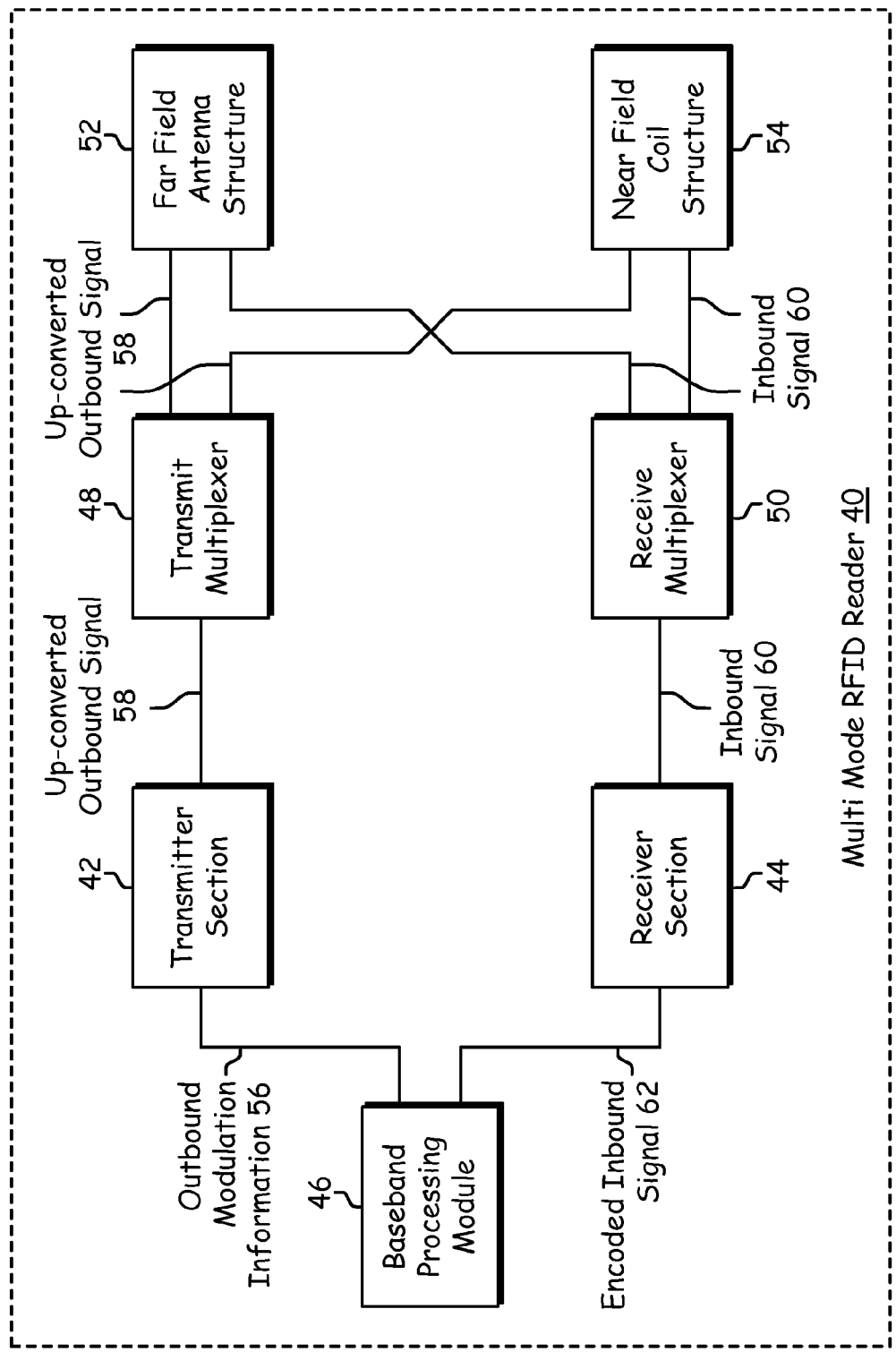
FIG. 2 is a schematic block diagram of an embodiment of a multi-mode RFID reader in accordance with the present invention.

FIG. 2 is a schematic block diagram of an embodiment of a multi-mode RFID reader 40 which can be used as one of the RFID readers 14-18 in FIG. 1. The multi-mode RFID reader 40 is operable to communicate in a far field mode to an RFID tag 20-30 with far field capability and/or in a near field mode to an RFID tag 20-30 with near field capability. The multi-mode RFID reader 40 includes a transmitter section 42, a receiver section 44 and baseband processing module 46. The multi-mode RFID reader 40 also includes a transmit multiplexer 48 and a receive multiplexer 50. Both the transmit multiplexer 48 and the receive multiplexer 50 are coupled to a far field antenna structure 52 and a near field coil structure 54.

The baseband processing module 46, transmitter section 42 and receiver section 44 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, hard coded and/or operational instructions corresponding to at least some of the steps and/or functions illustrated herein.

In operation, the baseband processing module 46 converts outbound data into outbound modulation information 5 and transmits the outbound modulation information 56 to transmitter section 42. The transmitter section 42 is operable to convert the outbound modulation information 56 into an up-converted outbound signal 58. The up-converted outbound signal 58 has a carrier frequency within the RF band and/or in the microwave band. In one embodiment, the up-converted outbound signal 58 is in the UHF range, and in particular in one embodiment, the up-converted outbound signal 58 is in the 860 MHz to 930 MHz UHF range. The transmitter section 42 is coupled to the transmit multiplexer 48. The transmit multiplexer 48 receives the up-converted outbound signal 58 from the transmitter section 42 and is operable to couple the up-converted outbound signal 58 to the near field coil structure 54 when the RFID reader 40 is in a near field mode and to output the up-converted outbound signal 58 to the far field antenna structure 52 when the RFID reader 40 is in a far field mode.

To receive signals, an inbound UHF signal 60 is detected at either the far field antenna structure 52 or the near field coil structure 54. The receive multiplexer 50 is coupled to output the inbound signal 60 from the near field coil structure 54 to the receiver section 44 when the RFID reader 40 is in the near field mode and to output the inbound signal 60 from the far field antenna structure 52 to the receiver section 50 when the RFID reader 40 is in the far field mode. The inbound signal 60 has a carrier frequency within the RF band and/or in the microwave band. In one embodiment, the inbound signal 60 is in the UHF range, and in particular in one embodiment, the inbound signal 60 is in the 860 MHz to 930 MHz UHF range. The receiver section 44 is operable to down convert the inbound signal 60 into an encoded inbound signal 62. The baseband processing module 46 is operable to convert the encoded inbound signal 62 into inbound data.

Figure 3:
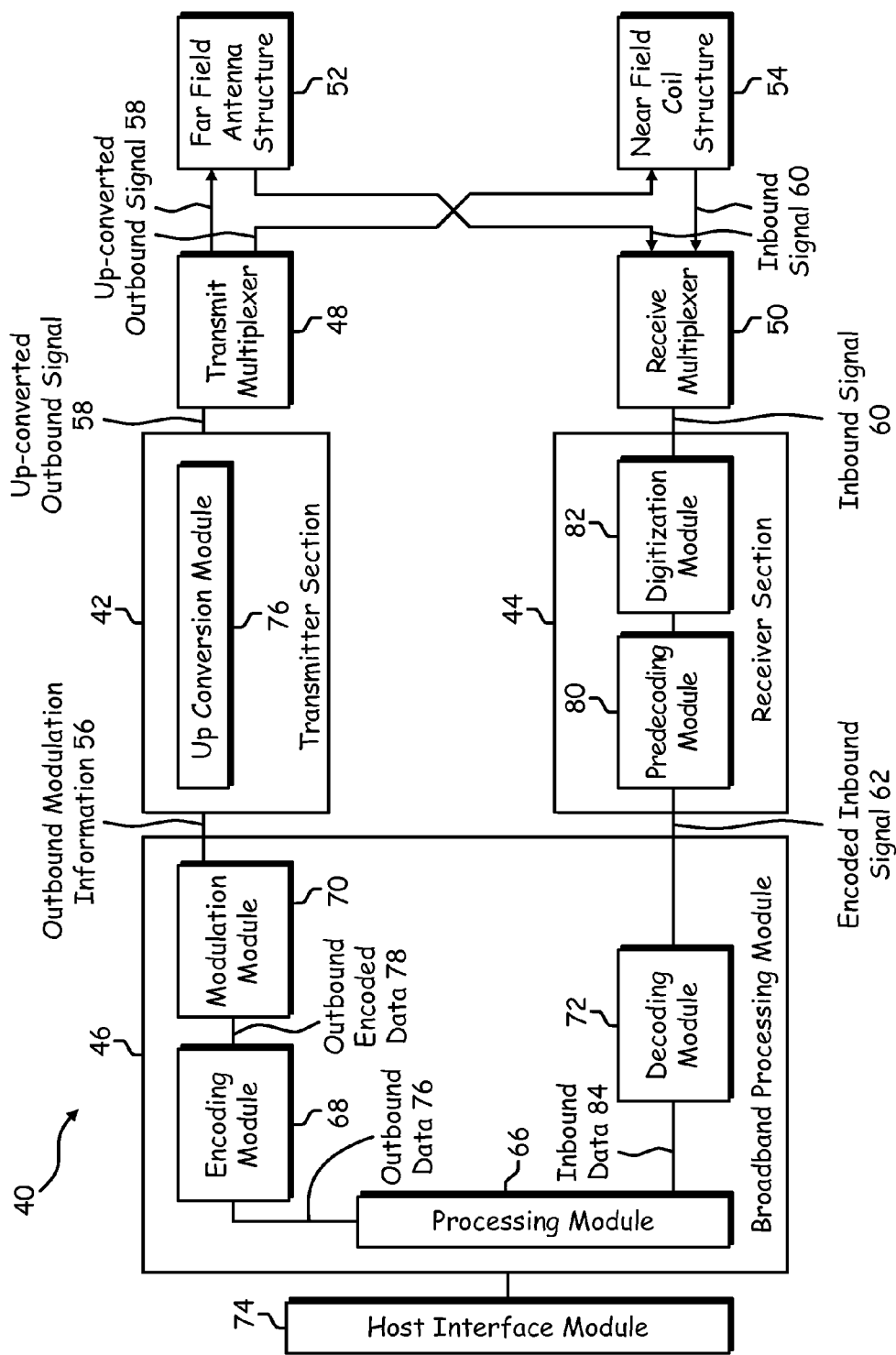
FIG. 3 is a schematic block diagram of another embodiment of a multi-mode RFID reader in accordance with the present invention.

FIG. 3 illustrates one embodiment of the multi-mode RFID reader 40 in more detail. As seen in FIG. 3, the baseband processing module 46 includes a processing module 66, an encoding module 68, modulation module 70 and decoding module 72. The baseband processing module 46 is also coupled to a host interface 74. The host interface module 74 may include a communication interface (USB dongle, compact flash or PCMCIA) to a host device, such as the computer server 12. In addition, the multi-mode RFID reader 40 includes an up conversion module 76 as part of the transmitter section 42 and a predecoding module 80 and digitization module 82 as part of the receiver section 44. The digitization module 82 may be an analog to digital convertor or a limiter while the predecoding module 80 includes one or more digital filters.

In operation, the processing module 66 may receive one or more commands or requests for data from the host interface module 74 that requires communication of data to one or more RFID tags 20-30. Alternatively, or in addition to, the processing module 66 may receive data from an RFID tag 20-30 that requires a response to be generated by the multi-mode RFID reader 40. As another alternative, or in addition to, the processing module 66 may determine itself that a command or other communication is necessary to one or more RFID tags 20-30. In response to the required communication, the processing module 66 generates outbound data 76 for communication to one or more RFID tags 20-30 and transmits the outbound data 76 to the encoding module 68.

The encoding module 68 is operable to convert the outbound data 76 into outbound encoded data 78 in accordance with a particular RFID standardized protocol. In an embodiment, the baseband processing module 46 is programmed with multiple RFID standardized and/or proprietary encoding protocols to enable the multi-mode RFID reader 40 to communicate with RFID tags 20-30 operating in accordance with different standardized and/or proprietary encoding protocols. By way of example, but not limitation, the encoding protocols may include one or more encoding schemes, such as Manchester encoding, FM0 encoding, FM1 encoding, etc. In particular, the encoding protocol utilized may depend on the mode of operation of the RFID reader 40. Different encoding protocols may be defined for encoding data for transmission in near field mode and in far field mode. For example, in near field mode, a first data encoding protocol may be used by the baseband processing module 46 for encoding data while a second data encoding protocol may be used by the baseband processing module 46 for encoding data in far field mode. A typical encoding protocol in near field mode includes Manchester coding, although other encoding protocols may be used. Also, in far field mode, typical encoding protocols comprise at least one of the following: Miller-modulated subcarrier coding and biphase-space encoding although other encoding protocols may be used. In addition, the first data encoding protocol for encoding outbound data 76 in near field mode may the same as the second data encoding protocol for encoding outbound data 76 in far field mode.

Once the particular encoding protocol has been selected for communication with one or more RFID tags 20-30, the processing module 66 generates and provides the outbound data 76 to be communicated to the RFID tag 20-30 to the encoding module 78. The processing module 66 communicates the encoding protocol selected, and the encoding module 78 encodes the outbound data 76 in accordance with the selected encoding protocol to convert the outbound data 76 into the outbound encoded data 78.

Thereafter, the outbound encoded data 78 is provided to the modulation module 70 which converts the outbound encoded data 78 into outbound modulation information 56 (e.g., phase, frequency, and/or amplitude modulation information). In an embodiment, the outbound modulation information 56 is one or more of binary phase shift keying (BPSK), quadrature PSK (QPSK), quadrature amplitude modulation (QAM), amplitude shift keying (ASK) modulation information, phase shift keying (PSK), load modulation, frequency shift keying (FSK), minimum shift keying (MSK), etc.

The outbound modulation information 56 is transmitted to the up conversion module 76, which utilizes the outbound modulation information 56 to generate an up-converted signal 58 at a carrier frequency in the RF band or microwave band. In one embodiment, the carrier frequency is in the ultra high frequency (UHF) range, which is approximately 300 MHz to 3 GHz. In an embodiment, the particular carrier frequency used by the multi-mode RFID reader 40 is a standardized carrier frequency in the UHF range, such as the ISO 18000 series 860-930 MHz UHF range or according to EPCglobal standards or other standards. However, the multi-mode RFID reader may be optimized for operation for any frequency within the RF band or microwave band, and in one embodiment in the UHF range.

The transmit multiplexer 48 is operable to have the up-converted outbound signal 58 transmitted by the near field coil structure 54 when the RFID reader 40 is in a near field mode and to have the up-converted outbound signal 58 transmitted by the far field antenna structure 52 when the RFID reader 40 is in a far field mode. In one embodiment, the RFID reader 40 generates an up-converted outbound signal 58 in the UHF range in both near field and far field mode, e.g. in the ISO 18000 series 860-930 MHz UHF range. In such an embodiment, the up-converted outbound signal 58 is in the UHF range even when transmitting over the near field coil structure 54 in near field mode using inductive or magnetic coupling.

In operation to receive an inbound signal 60, the receive multiplexer 50 is coupled to output the inbound signal 60 from the near field coil structure 54 to the receiver section 44 when the RFID reader 40 is in the near field mode and to output the inbound signal 60 from the far field antenna structure 52 to the receiver section 44 when the RFID reader 40 is in the far field mode. In one embodiment, the inbound signal 60 is in the UHF range in both near field and far field mode, e.g. in the ISO 18000 series 860-930 MHz UHF range. In such an embodiment, the inbound signal 60 is in the UHF range even when receiving the inbound signal 60 over the near field coil structure 54 in near field mode using inductive or magnetic coupling.

The digitization module 82 and predecoding module 80 in the receiver section 44 converts the analog inbound signal 60 into digital encoded inbound signal 62. The receiver section 44 is operable to transmit the encoded inbound signal 62 to the baseband processing module 46. The decoding module 72 in the baseband processing module 46 decodes the encoded inbound signal 62. As explained above in an embodiment, the baseband processing module 46 is programmed with multiple RFID standardized protocols such that the decoding module 72 is operable to decode the encoded inbound signal 62 using one or more encoding protocols. By way of example, but not limitation, the encoding protocols may include one or more encoding schemes, such as Manchester encoding, FM0 encoding, FM1 encoding, etc. In particular, the encoding scheme utilized may depend on the mode of operation of the RFID reader 40. Different data encoding protocols may be defined for decoding data in near field mode and in far field mode. When operating in near field mode, the decoding module 72 may attempt to decode the encoded inbound signal 62 using a first protocol typical in near field operations, such as Manchester coding. If such decoding is unsuccessful, the decoding module 72 is operable to attempt to decode the encoded inbound signal 62 with a next protocol until the encoded inbound signal 62 is decoded. Similarly, when operating in far field mode, the decoding module 72 may attempt to decode the encoded inbound signal 62 using a second protocol typical in far field operations, such as Miller-modulated subcarrier coding and biphase-space encoding. If such decoding is unsuccessful, the decoding module 72 is operable to attempt decoding the encoded inbound signal 62 with a next protocol until the encoded inbound signal 62 is decoded. Once the particular encoding protocol has been determined for decoding the encoded inbound signal 62, the decoding module 72 decodes and generates the inbound data 84 to be communicated to the processing module 66.

The processing module 66 signals the other modules of the RFID reader 40, such as the encoding module 66, modulation module 70, transmitter section 42 and/or transmit multiplexer 48, the receiver section 44 and/or receive multiplexer 50 that the RFID reader 40 is operating in the near field mode or the far field mode. Various factors may determine whether the RFID reader 40 operates in near field mode or far field mode. For example, the RFID reader 40 may default to far field mode or a user input to the RFID reader 40 may determine the mode of operation or a command received through the hose interface module 74 may determine the mode of operation. In another alternative, the RFID reader 40 may transmit an interrogation signal to one or more tags 20-30 in far field mode using RF coupling over the far field antenna structure 52, and then transmit an interrogation signal to one or more tags 20-30 in near field mode using inductive or magnetic coupling over the near field antenna structure. The RFID reader 40 may then compare an input signal strength indication, transmit power levels, signal to noise ratio, ability to decode the inbound signal (e.g., error rate), and/or other indicators to determine the mode of operation to communicate with each tag 20-30.

In addition, certain tags 20-30 (hereinafter called multi-mode tags) may be operable to communicate in both near field mode and far field mode. See, e.g., U.S. patent application Ser. No. 11/984,544, filed Oct. 30, 2007, entitled, "Multi-Mode RFID Tag Architecture,", the entirety of which is incorporated herein. It may be advantageous to communicate in both modes with such a multi-mode tag. For example, when such a multi-mode tag is farther away, such as in a far field range, the RFID reader 40 operates in far field mode to communicate with the multi-mode tag. When the tag is in a closer near field range, the RFID reader operates in a near field mode to communicate with the multi-mode tag. In another method of operation, the RFID reader may operate in far field mode for general interrogation signals to multi-mode RFID tags but then operate in near field mode for more secure communications involving confidential, sensitive or private information to a particular multi-mode tag. To switch from one mode of operation to another during a communication with a multi-mode tag, the baseband processing module 46 encodes a data signal command for transmission in far field mode to one or more multi-mode tags to operate in near field mode; and upon receipt of a decoded inbound data 84 from the one or more multi-mode tags with an acknowledgement of the command, the baseband processing module 46 signals the other modules in the RFID reader 46 to operate in near field mode to communicate with the one or more multi-mode tags. The same procedure may be used to switch from near field mode to far field mode.

Figure 4A:
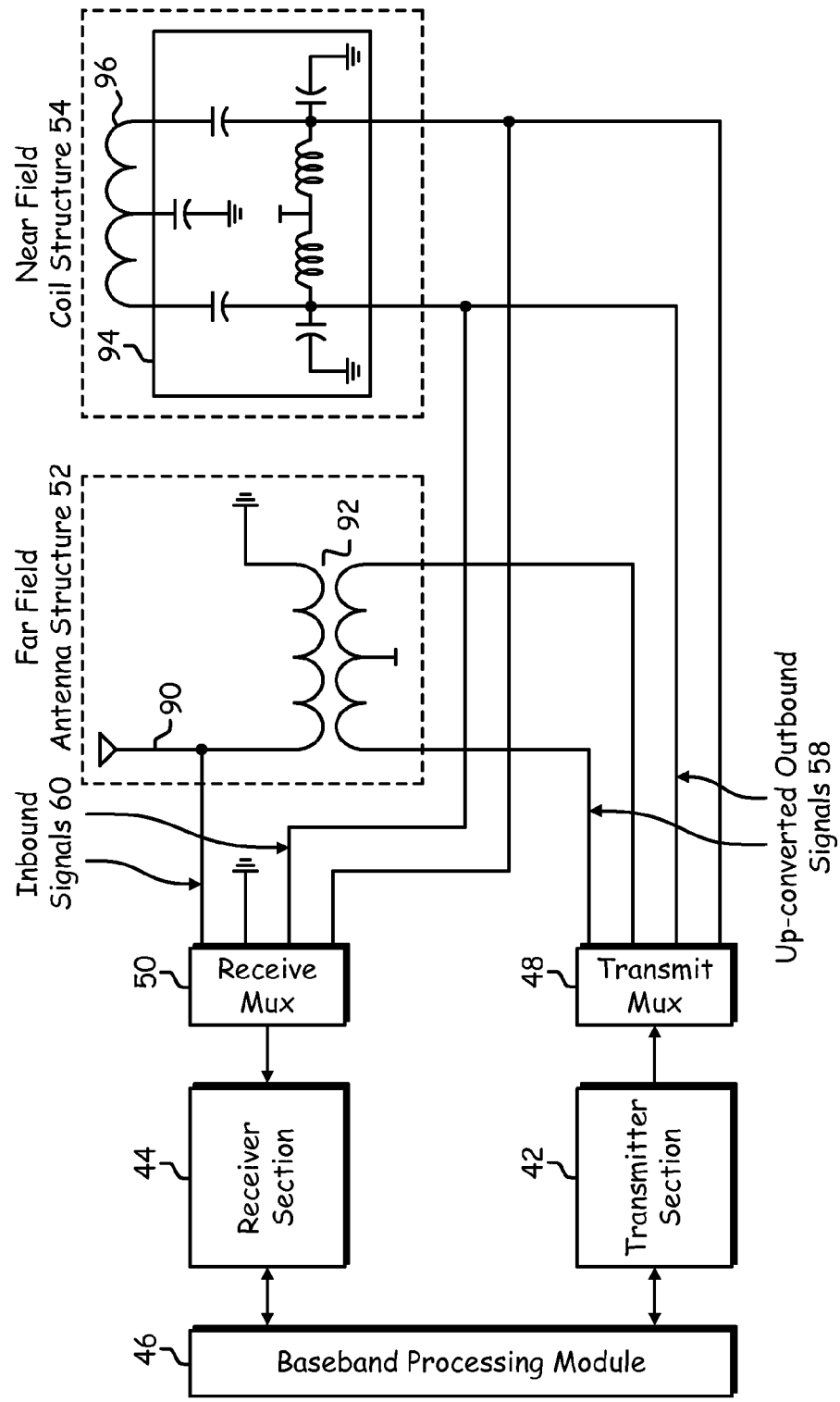
FIG. 4a is a schematic block diagram of an embodiment of the near field coil structure and the far field antenna structure of a multi-mode RFID reader in accordance with the present invention.

FIG. 4a illustrates one embodiment of the near field coil structure 54 and the far field antenna structure 52 in more detail. First, with respect to the far field antenna structure 52, generally, RFID reader to tag distances greater than $\lambda/2\pi$ are optimal for far field mode with RF coupling. Thus, the far field antenna structure 52 may be any type of antenna structure for transmitting in the far field range. In one embodiment shown in FIG. 41, the far field antenna structure 52 includes at least one antenna 90 and at least one transformer balun 92. The antenna 90 and transformer balun 92 are optimized for transmitting the up-converted outbound signal 58 using RF coupling in far field mode and receiving of the inbound signal 60 using RF coupling in far field mode. The antenna 90 can be one or more of several types of antennas optimized for the desired frequency of operation and application. The antenna 90 may be a dipole type antenna, a folded dipole, a half-wave dipole, monopole, differential antenna and/or another type antenna. In one embodiment, the antenna 90 can be bent or meandered with capacitive tip-loading or bowtie-like broadband structures. The transformer balun 92 provides impedance matching for the antenna 90. Other types of transformers or impedance circuits may be used with or in place of the transformer balun 92 to provide the necessary impedance matching needed for the antenna 90. In FIG. 4a, the receive multiplexer 50 is connected to the single ended antenna 90. However, the antenna 90 may be a differential antenna and/or the receive multiplexer 50 may also be connected to the output of the transformer balun 92 as with the transmit multiplexer 48.

Figure 4B:
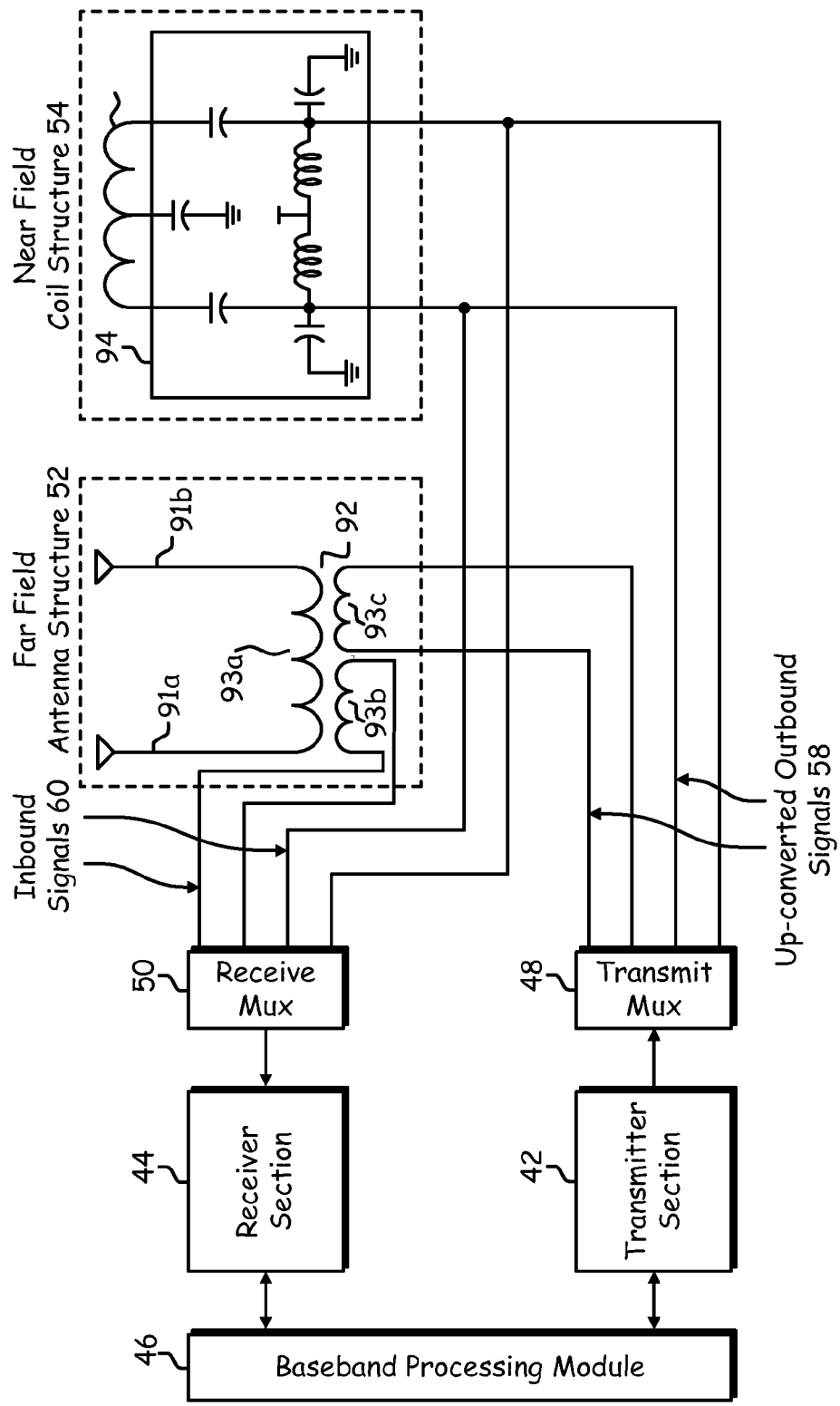
FIG. 4b is a schematic block diagram of another embodiment of the near field coil structure and the far field antenna structure of a multi-mode RFID reader in accordance with the present invention.

Another embodiment of the far field antenna structure is shown in FIG. 4b. The far field antenna structure 52 includes a first antenna 91a and a second antenna 91b. The antennas 91a and 91b are differential antennas. The far field antenna structure also includes a transformer balun 92 with a primary winding 93a connected to the first antenna 91a and second antenna 91b. The secondary winding 93b,c has a four differential input wherein the secondary winding 93b has more turns between the inputs connected to the receive multiplexer 44. The secondary winding 93c connected to the transmit multiplexer has a smaller number of turns. Since the ratio of the primary winding turns to the secondary winding turns of a transformer is proportional to the voltage gain, the receive input thus has a larger voltage gain. In far field mode, the up-converted outbound signals 58 are transmitted from the far field antenna structure 52 by RF coupling to an RF antenna structure on a tag 20-30, and the inbound signals 60 are received by the far field antenna structure 52 by RF coupling to an RF antenna structure on a tag 20-30.

The near field coil structure 54 includes at least one inductor that operates as a coil antenna 96 and at least one impedance coupling circuit 94. The impedance coupling circuit 94 includes one or more capacitors C1-C3 coupled with one or more inductors L1, L2. The inductors L1, L2 and the capacitors C1-C3 form a resonant circuit with the coil antenna 96 tuned to the frequency of the up-converted outbound signal 58. Due to the parallel resonant circuit, the up-converted outbound signal 58 through the coil antenna 96 generates a strong magnetic field around the coil antenna 96. The magnetic field generated by the coil antenna 96 produces an inductive or magnetic coupling with a coil antenna of a tag 20-30 within the near field of the coil antenna 96. If the coil antenna 96 is a round or u-shaped ferrite core with windings, a magnetic coupling with a tag occurs in near field mode. Generally, with magnetic coupling, the tag 20-30 must be inserted into the RFID reader 40 so magnetic coupling is ideal for smart card applications. Generally, RFID reader to tag distances less than $\lambda/2\pi$ are optimal for near field mode with inductive or magnetic coupling. The tag generates and transmits a response signal to the RFID reader through inductive or magnetic coupling in the same manner.

The RFID reader 40 operates in either far field mode or near field mode. In far field mode, the transmit multiplexer 48 provides the up-converted outbound signal or signals 58 to the far field antenna structure 52 and the receive multiplexer 50 provides inbound UHF signal or signals 60 to the receiver section 44. In far field mode, the near field coil structure 54 is inactive. For near field operation, the transmit multiplexer 48 provides the up-converted outbound signal or signals 58, to the near field coil structure 54 and the receive multiplexer 50 provides inbound signal or signals 60 to the receiver section 44. In near field mode, the far field antenna structure 52 is inactive.

Figure 5:
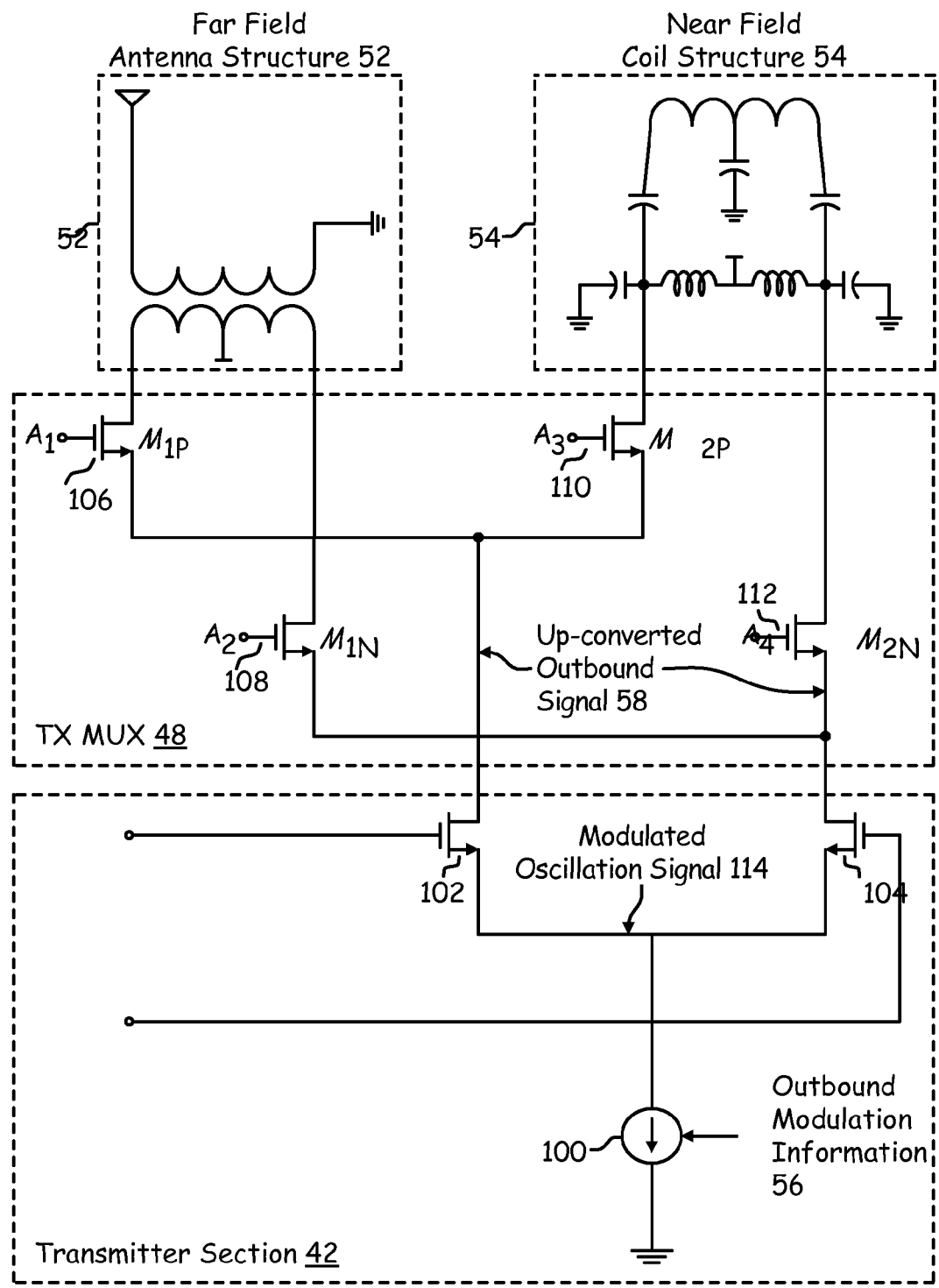
FIG. 5 is a schematic block diagram of an embodiment of a transmit multiplexer and transmitter section of a multi-mode RFID reader in accordance with the present invention.

FIG. 5 illustrates one embodiment of the transmit multiplexer and transmitter section of the RFID reader 40 in more detail. The transmitter section 42 includes a current source 100 and input transistors 102, 104. The transmit multiplexer 48 includes multiplexer transistors 106, 108, 110, 112. The multiplexer transistors 106, 108 are coupled to the input transistors 102, 104 and to the RFID far field antenna structure 52. The multiplexer transistors 110, 112 are coupled to the input transistors 102, 104 and the RFID near field antenna structure 54. Each of the multiplexer transistors 106, 108, 110 and 112 include an activation input (e.g., a gate) $A_1$ through $A_4$, respectively.

In operation, the current source 100 is modulated based on the outbound modulation information 56 from the baseband processing module 46. In an embodiment, the current source 100 is in the ultra high frequency range. The input transistors 102, 104 are coupled to the current source 100 to receive the modulated oscillation signal 114. In combination, the current source 100 and the input transistors 102, 104 produce the up-converted outbound signal 58.

In far field mode, the transmitter section 42 is operable to transmit a signal to activate the activation input A1 of multiplexer transistor 106 and activation input A2 of multiplexer transistor 108. The multiplexer transistors 106, 108 are then operable to output the up-converted outbound signal 58 to the far field coil structure 52. In near field mode, the transmitter section 42 is operable to transmit a signal to activate the activation input A3 of multiplexer transistor 110 and activation input A4 of multiplexer transistor 112. The multiplexer transistors 110, 112 are then operable to output the up-converted outbound signal 58 to the near field coil structure 54. Thus, the transmitter section 42 is operable to signal the transmit multiplexer 48 to activate the first set of transistors 106 and 108 to transmit in far field mode and to activate the second set of transistors 110 and 112 to operate in near field mode. Alternatively, the baseband processing module 46 or the processing module 66 may signal the transmit multiplexer 48 rather than the transmitter section 42.

Figure 6:
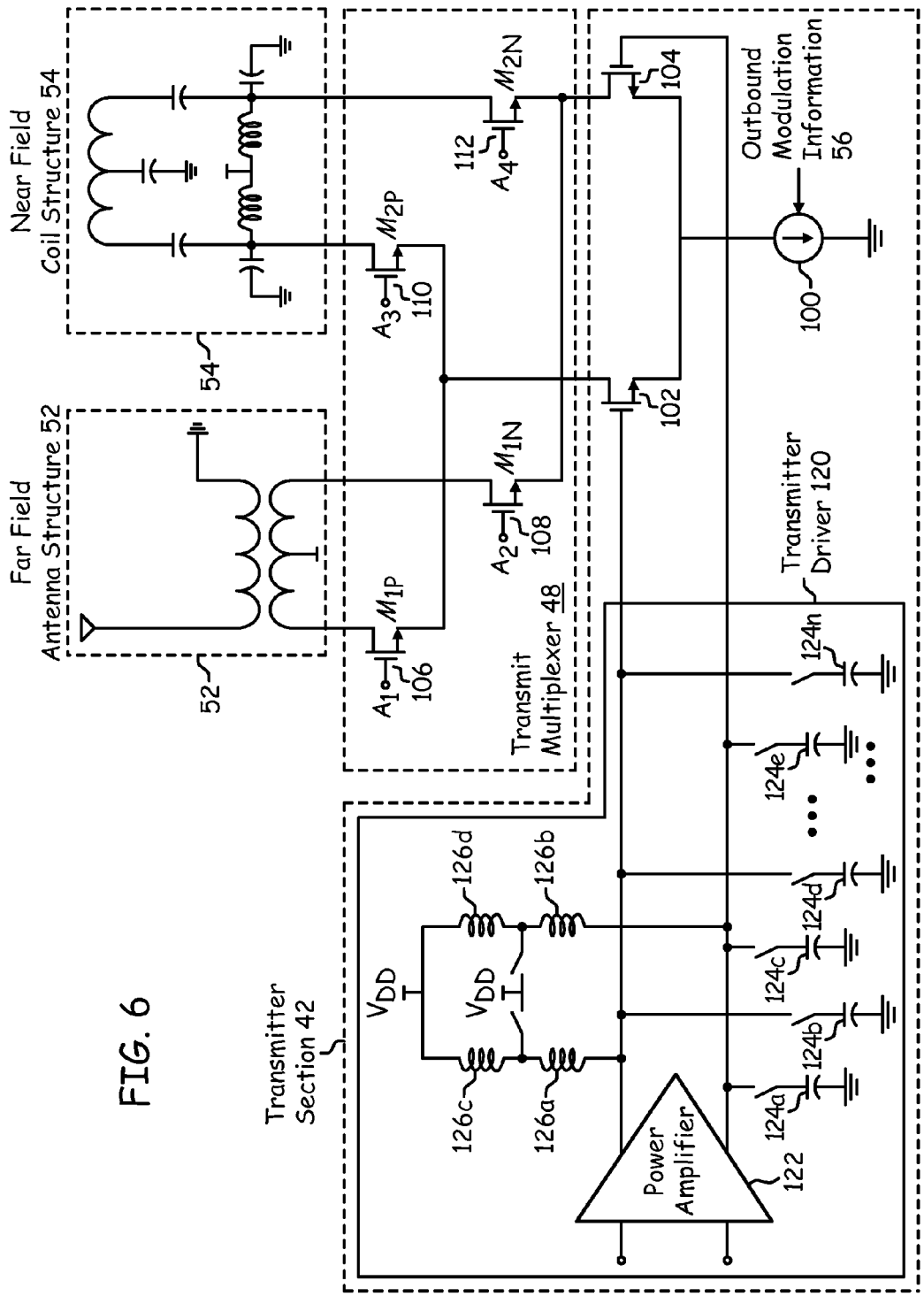
FIG. 6 is a schematic block diagram of an embodiment of a transmitter driver circuit module in a transmitter section of a multi-mode RFID reader in accordance with the present invention.

FIG. 6 is a schematic block diagram of an embodiment of a transmitter driver circuit module 120 in a transmitter section 42 of the multi mode RFID reader 40. The transmitter driver circuit module 120 includes a power amplifier 122 with outputs coupled to gates of the input transistors 102, 104. A plurality of capacitors 124a through 124n are configurably coupled to the outputs of the power amplifier and to the gates of the input transistors 102, 104. A plurality of inductors 126a, 126b, 126c and 126d are configurably coupled to the outputs of the power amplifier 122 and to the gates of the input transistors 102, 104.

In operation, the power amplifier 122 and capacitors 124a through 124n and inductors 126a through 126d form a resonant output that can be tuned to the desired frequency of the up-converted outbound signal 58. The capacitors 124a through 124n and inductors 126a through 126d are configurably coupled to the outputs of the power amplifier and to the gates of the input transistors 102, 104 such that the resonant output may be tuned to the desired frequency. Often capacitors on an integrated circuit or chip have a large tolerance due to process variations and so the configurably coupled capacitors 124a through 124n can be tuned to overcome this issue.

The multi-mode RFID reader 40 thus provides near field and far field mode operation. By operating in both near field and far field mode, the RFID reader 40 provides multi-standard, multi-technology option for use in multiple applications. As such, the RFID readers are not limited to only near read or far read applications but can be used in both type applications and are operable to be switched from near field mode to far field mode or from far field mode to near field mode to accommodate different types of RFID tags and differing distances between the multi-mode RFID reader and an RFID tag. In one embodiment, the near field and far field mode operation are both in the UHF range. Though the range of communication is smaller (e.g., <5 mm) in near field mode using UHF signals than at lower frequencies (such as HF and LF), such UHF near field RFID communications are well suited for near read applications, such as inventory items, monitory paper authentication, passports, credit cards, etc. The near field UHF operation of the RFID reader 40 also has more efficient operation near fluids, such as fluid medication bottles.

Figure 7:
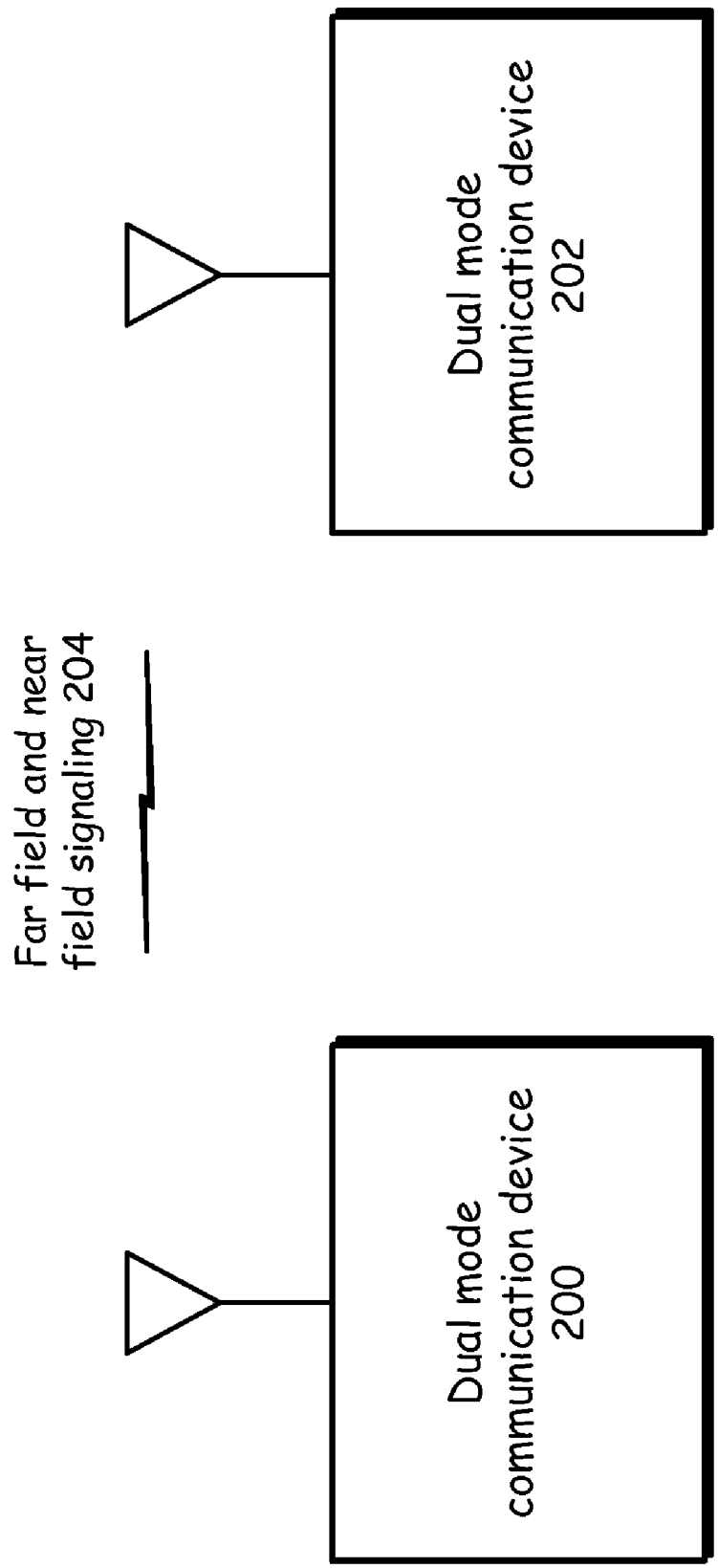
FIG. 7 is a schematic block diagram of an embodiment of a dual mode transmission system in accordance with the present invention.

FIG. 7 is a schematic block diagram of an embodiment of a dual mode transmission system in accordance with the present invention. In particular, while the present invention has been previously described in conjunction with RFID readers and RFID tags that are capable of operating in both near field and far field modes, the application of the present invention can be further applied to other communication systems as well. In particular, dual mode communication devices 200 and 202 are presented that are capable of communicating via far field and/or near field signaling 204, based on for instance, the type of data the is being transmitted and the application, the distance between the dual mode communication devices 200 and 202, based on the desired data rate, based on the level security associated with the communications, and/or based on other criteria.

Further, far field and near field communications can be used simultaneously for communication between devices, or partially between devices and simultaneously with other devices such as other far field communication devices, other near field communication devices and other dual mode communication devices. While dual mode communication devices 200 and 202 can operate in a similar fashion to the devices previously described in conjunction with FIGS. 1-6, in an embodiment of the present invention, the dual mode communication devices 200 and 202 include a transceiver as described in conjunction with FIGS. 8 and 11-14 and/or a dual mode antenna as described in conjunction with FIGS. 9-10 and 15.

Figure 8:
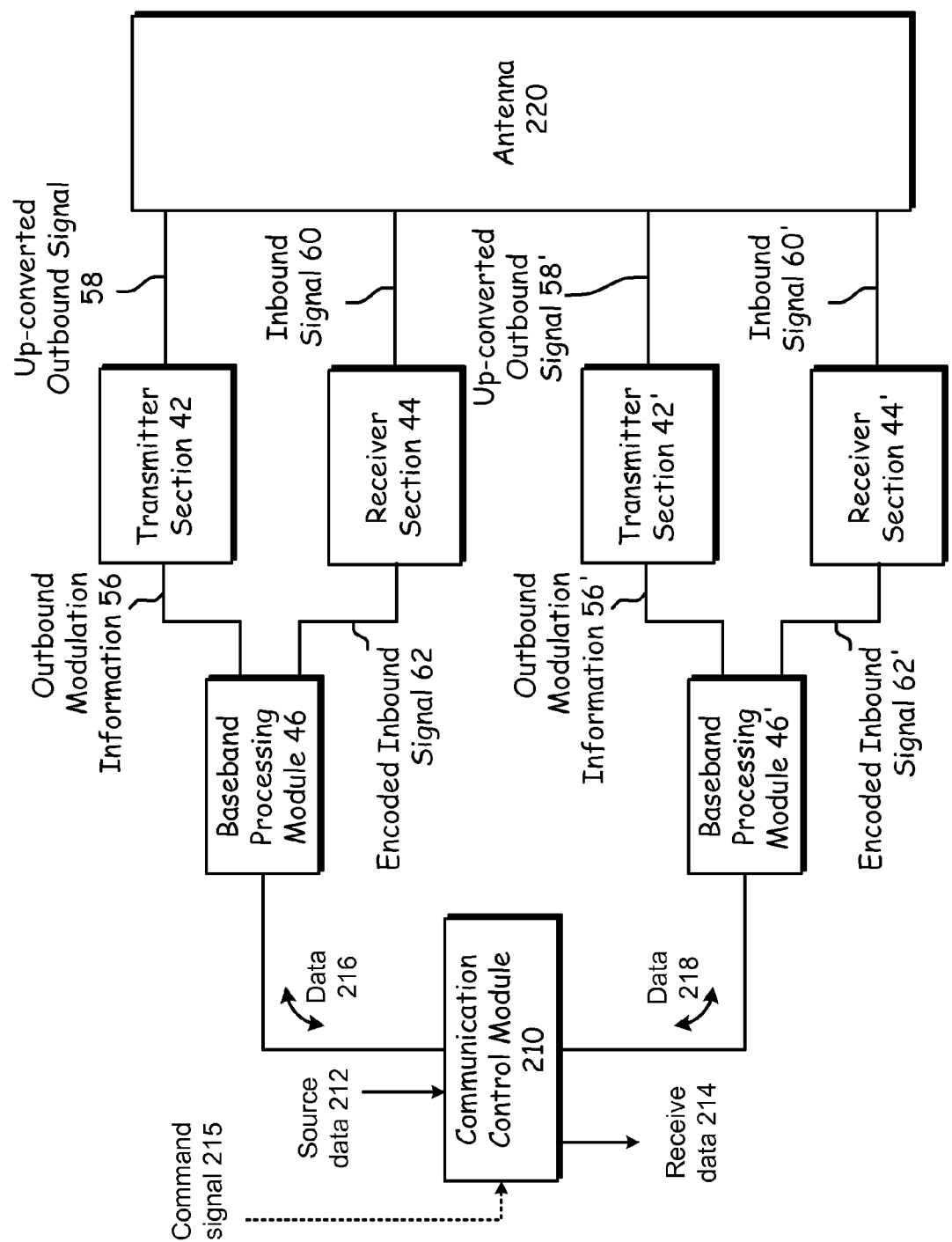
FIG. 8 is a schematic block diagram of an embodiment of a transceiver in accordance with the present invention.

FIG. 8 is a schematic block diagram of an embodiment of a transceiver in accordance with the present invention. In particular, a near field transceiver section is provided that includes baseband processing module 46, transmitter section 42 and receiver section 44 for producing an upconverted outbound signal 58 based on source data and that processes inbound signal 60 to extract received data therefrom. Further, a far field transceiver section is provided that includes baseband processing module 46', transmitter section 42' and receiver section 44' for producing an upconverted outbound signal 58' based on source data and that processes inbound signal 60' to extract received data therefrom.

In an embodiment of the present invention, the baseband processing module 46, transmitter section 42 and receiver section 44 generally perform as previously described for near field operation. For instance, the near field transceiver section can operate in a 900 MHz band, a 13.5 MHz band, a 5 MHz band, a UHF band and/or other frequency band to engage in near field communications via antenna 220. Further, the baseband processing module 46', transmitter section 42' and receiver section 44' generally perform in a similar fashion, yet optionally in accordance with different protocols. In operation, the baseband processing module 46' converts outbound data into outbound modulation information 56' and transmits the outbound modulation information 56' to transmitter section 42'. The transmitter section 42' is operable to convert the outbound modulation information 56' into an up-converted outbound signal 58'. The up-converted outbound signal 58' has a carrier frequency within the millimeter wave band and/or in the microwave band.

To receive signals, an inbound signal 60' is detected at the antenna 220. The inbound signal 60' has a carrier frequency within the millimeter wave band and/or in the microwave band. The receiver section 44' is operable to down convert the inbound signal 60' into an encoded inbound signal 62'. The baseband processing module 46' is operable to convert the encoded inbound signal 62' into inbound data.

As described, the far field transceiver section can operate in a millimeter wave frequency band, such as a 60 GHz band or other frequency band to engage in far field communications via antenna 220. Antenna 220 can include a single antenna such as antenna 250 or antenna 252 presented in conjunction with FIGS. 9 and 10. In the alternative, antenna 220 can include multiple antennas operating in different bands, with separate transmit and receive antenna, an antenna array or phased array, or other antenna configuration.

Communication control module 210 is included to selectively engage the far field transceiver section and the near-field transceiver section. In this fashion, the communication control module 210 can control the operation of the transceiver in several different modes of operation. For instance, in a first mode of operation, the communication control module 210 can engage the far field transceiver section. In a second mode of operation, the communication control module 210 can engage the near-field communication section. In a third mode of operation, the communication control module 210 can contemporaneously engage the far field transceiver section and the near-field communication section. The two different communication paths can be operated independently or in concert to effectuate a particular application involving the communication of data to and/or from a particular dual mode communication device 200 or 202.

In operation, communication module 210 receives source data 212 from a host device, data interface, processor, application or other source and selectively allocates all or a part of the source data 212 either baseband processing module 46 or baseband processing module 46', based on the mode of operation. In either the first or the second mode of operation, communication control module optionally passes through the source data 212 as either data 216 or data 218 however, additional formatting can be employed based on the type of coupling between communication control module 210 and the baseband processing modules 46 and 46', optional protocols used, etc. In the third mode of operation where both the near field transceiver section and the far field transceiver section are employed, source data is allocated between the baseband processing modules 46 and 46' based on which if the communications links will carry the data. The communication control module can allocate the source data 212 as either data 216 or data 218 based on the type of data, the data rate of the data, or under command of an application, processor host device or other module based on an optional command signal 215. Further, inbound data from baseband processing modules 46 and 46' is provided to communication control module 210 for conversion to receive data 214. In either the first or the second mode of operation, communication control module optionally passes through the receive data 214 from either data 216 or data 218, however, additional formatting can be employed based on the type of coupling between communication control module 210 and the baseband processing modules 46 and 46', optional protocols used, etc. In the third mode of operation where both the near field transceiver section and the far field transceiver section are employed, receive data 214 is formed from both data 216 and data 218.

In an embodiment of the present invention, data 216 and data 218 can include portions of receive data 214 and source data 212 as described above. Data 216 and data 218 can further include control data from communication control module 210 to selectively engage all or part of the near field transceiver section and the far field transceiver section and feedback data from the near field and far field transceiver sections that indicate reception characteristics, the presence of other devices in range of the transceiver, wake-up, hold, or sleep commands or requests issued by remote devices and other information that can be used by communication control module 210 in selectively engaging or disengaging the near field and far field transceiver sections. In an embodiment, when disengaged, each section can remain in a receive-only mode to detect the present of remote devices. When a remote device comes in range, as determined by the reception of a signal, such as a beacon signal, handshake signal, registration signal, or other signal of sufficient strength to be reliably detected and or decoded, or when a wake up signal is received (and the remote device is optionally verified based on comparison of received registration information to registration information stored in communication control module 210), the communication control module 210 respond by selectively engaging the corresponding transceiver section to engage in transmissions under the control of baseband processing module 46 or 46'. In another embodiment, the near field and far field transceiver sections can be selectively disengaged by disabling or powering down the entire unit.

In a particular embodiment, the communication control module 210, in the second mode of operation, communicates second data, either inbound or outbound, that includes security data. When operating subsequently in the first mode of operation, the far field transceiver section uses the security data to establish secure communication between the far field transceiver section and a remote device via the far field signaling. The security data can include a password, encryption key or other security information that could possibly be intercepted by other devices also within range of the far field signaling and thus be potentially compromised. Using the near field transceiver to send or receive this security data increases the security of the transfer given the short range nature of the near field signaling.

In an embodiment, the communication control module 210, selectively allocates outbound data or other source data 212 as data 216 for formatting by baseband processing module 46 in accordance with a first communication protocol and a first data rate or as data 218 for formatting by baseband processing module 46' in accordance with a second communication protocol and at a second data rate. In this fashion, communication control module 210 can allocate outgoing data to either near field communication or far field communication depending on a desired data rate, depending on which link is currently active, etc. Further, in the third mode of operation, source data can be split into first and second data streams that are processed via the two separate links for transmission.

In a similar fashion, the transceiver selectively generates receive data 214 or other inbound data based on data 216 in accordance with a first communication protocol and a first data rate and based on data 218 in accordance with a second communication protocol and at a second data rate. For example, a single stream of receive data 214 can be generated based on data 216 and 218 received via both links contemporaneously.

Communication control module 210 can be a dedicated or shared processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. Communication control module 210 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the communication control module 210 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, hard coded and/or operational instructions corresponding to at least some of the steps and/or functions illustrated in FIGS. 8 and 11-14. While communication control module 210 and baseband processing modules 46 and 46' are shown as separate units, some or all of the functionality of these devices can be shared or combined.

Figure 9:
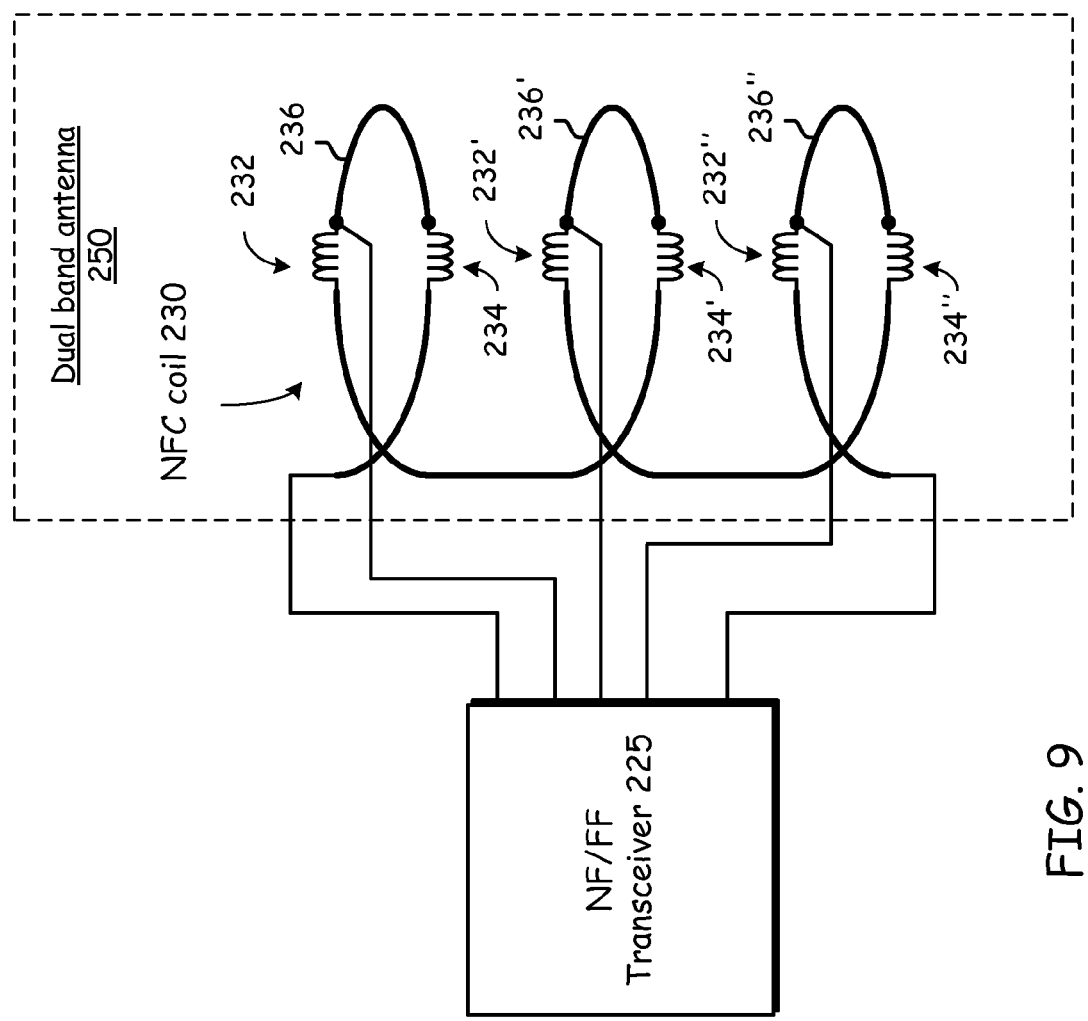
FIG. 9 is a schematic block diagram of an embodiment of a dual band antenna in accordance with the present invention.

FIG. 9 is a schematic block diagram of an embodiment of a dual band antenna in accordance with the present invention. In particular, a dual band antenna 250, such as antenna 220, is shown for operation in conjunction with a near field/far field transceiver 225, such as the transceiver described in conjunction with FIG. 8. In particular, the dual band antenna includes a far field antenna structure, that includes monopole elements 236, 236' and 236", for facilitating the communication of first data with a remote device via far field signaling in a millimeter wave band. While shown with three monopole elements the far field antenna structure can be implemented with a greater or fewer number of elements.

A near field antenna structure, shown as near field coil 230, facilitates communication of second data with a remote device via near field signaling in a near field band. As shown the near field coil has three turns, however a greater or fewer number of turns can likewise be employed. As shown, the far field antenna structure and the near field antenna structure share common antenna element 236, 236' and 236" that are implemented as separate portions of the near field coil 230. In particular, inductors 232 and 234 are included in near field coil 230 to isolate element 236 from the remainder of the near field coil 230 at the millimeter wave band. In operation, the inductors 232 and 234 conduct at near field band frequencies while providing a high impedance at millimeter wave frequencies. Similarly, inductors 232' and 234' are included in near field coil 230 isolate element 236' from the remainder of the near field coil 230 at the millimeter wave band. Further, inductors 232" and 234" are included in near field coil 230 to isolate element 236' from the remainder of the near field coil 230 at the millimeter wave band.

Figure 10:
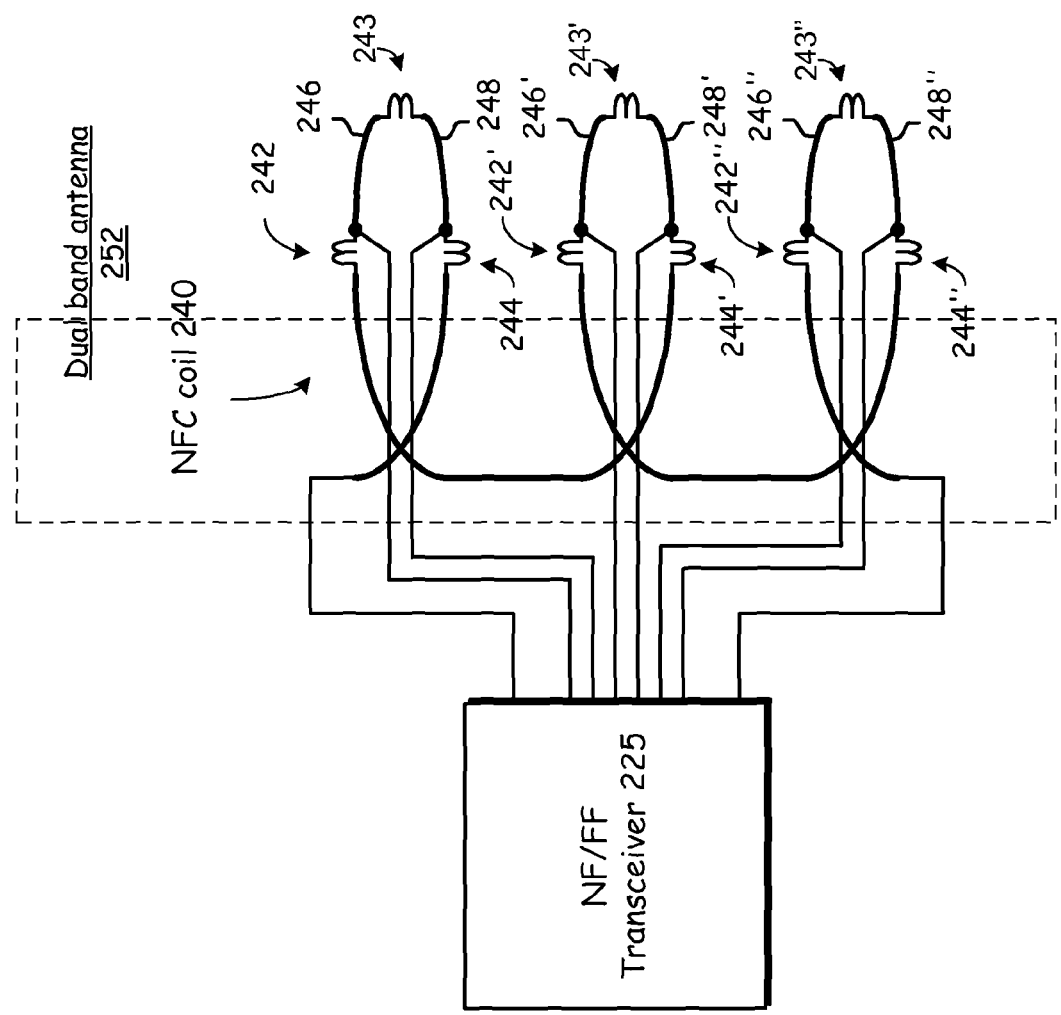
FIG. 10 is a schematic block diagram of another embodiment of a dual band antenna in accordance with the present invention.

FIG. 10 is a schematic block diagram of another embodiment of a dual band antenna in accordance with the present invention. In particular, a dual band antenna 252, such as antenna 220, is shown for operation in conjunction with a near field/far field transceiver 225, such as the transceiver described in conjunction with FIG. 8. In particular, the dual band antenna includes a far field antenna structure, that includes dipole elements (246, 248), (246', 248') and (246", 248"), for facilitating the communication of first data with a remote device via far field signaling in a millimeter wave band. While shown with three dipole elements the far field antenna structure can be implemented with a greater or fewer number of elements.

Figure 11:
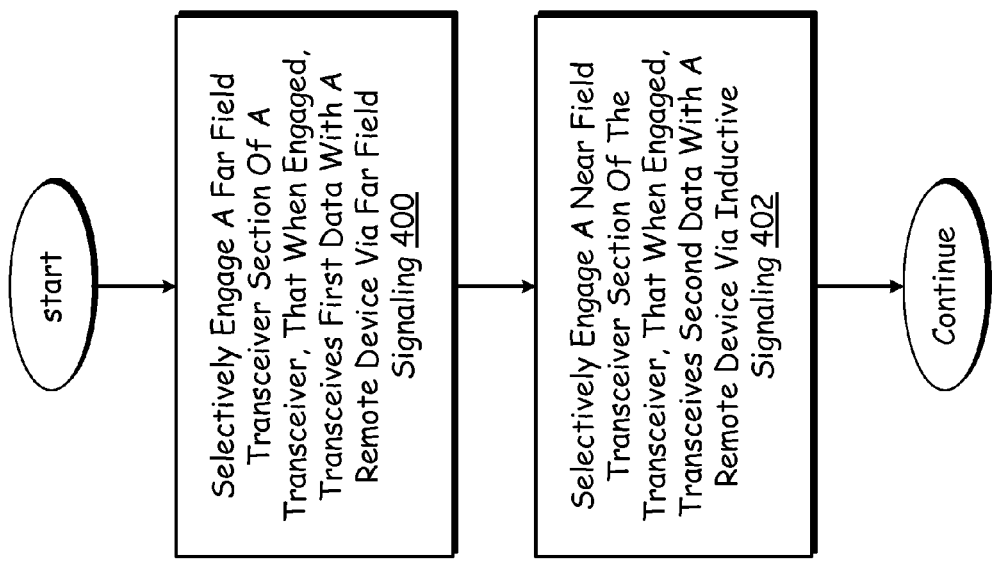
FIG. 11 is a flow chart representation of an embodiment of a method in accordance with the present invention.

A near field antenna structure, shown as near field coil 240, facilitates communication of second data with a remote device via near field signaling in a near field band. As shown the near field coil has three turns, however a greater or fewer number of turns can likewise be employed. As shown, the far field antenna structure and the near field antenna structure share common antenna elements (246, 248), (246', 248') and (246", 248") that are implemented as separate portions of the near field coil 240. In particular, inductors 242 and 244 are included in near field coil 240 to isolate elements 246 and 248 from the remainder of the near field coil 240 at the millimeter wave band. Further the inductor 243 isolates the dipole antenna elements 246 and 248 from one another at the millimeter wave band. In operation, the inductors 242, 243, and 244 conduct at near field band frequencies while providing a high impedance at millimeter wave frequencies. Similarly, inductors 242' and 244' are included in near field coil 240 to isolate elements 246' and 248' from the remainder of the near field coil 240 at the millimeter wave band and the inductor 243' isolates the dipole antenna elements 246' and 248' from one another at the millimeter wave band. Further, inductors 242" and 244" are included in near field coil 240 to isolate elements 246" and 248" from the remainder of the near field coil 240 at the millimeter wave band, while the inductor 243" isolates the dipole antenna elements 246" and 248" from one another at the millimeter wave band FIG. 11 is a flow chart representation of an embodiment of a method in accordance with the present invention. In particular, a method is shown for use in conjunction with one or more of the functions and features described in conjunction with FIGS. 1-10. In step 400, when a far field transceiver section of a transceiver is selectively engaged, it transceives first data with a remote device via far field signaling. In step 402, when a near field transceiver section of the transceiver is selectively engaged, it transceives second data with the remote device via near field signaling.

In an embodiment of the present invention, the method operates in a first mode of operation, by engaging the far field transceiver section, in a second mode of operation, by engaging the near-field communication section, and in a third mode of operation, by contemporaneously engaging the far field transceiver section and the near-field communication section. The first mode of operation can include receiving second data that includes security data, and the second mode of operation includes establishing secure communication between the far field transceiver section and the remote device via the far field signaling, based on the security data. The secure data includes an encryption key, password or other security data. Step 400 can include transceiving the first data at a first data rate and step 402 can include transceiving at a second data rate that is lower than the first data rate.

Figure 12:
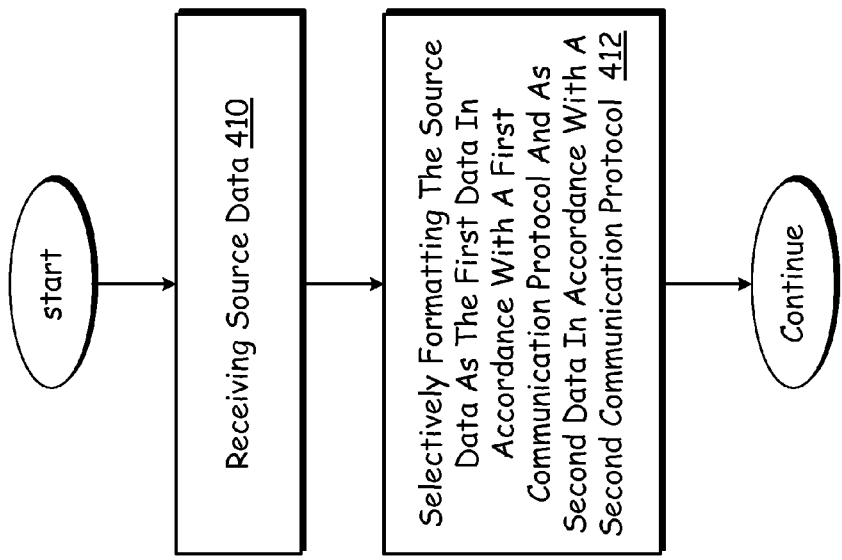
FIG. 12 is a flow chart representation of an embodiment of a method in accordance with the present invention.

FIG. 12 is a flow chart representation of an embodiment of a method in accordance with the present invention; In particular, a method is shown for use in conjunction with one or more of the functions and features described in conjunction with FIGS. 1-11. In step 410, source data is received. In step 412, the source data is selectively formatted as first data in accordance with a first communication protocol and as second data in accordance with a second communication protocol. Step 412 can include formatting a first portion of the source data as first data and formatting a second portion of the source data as second data.

Figure 13:
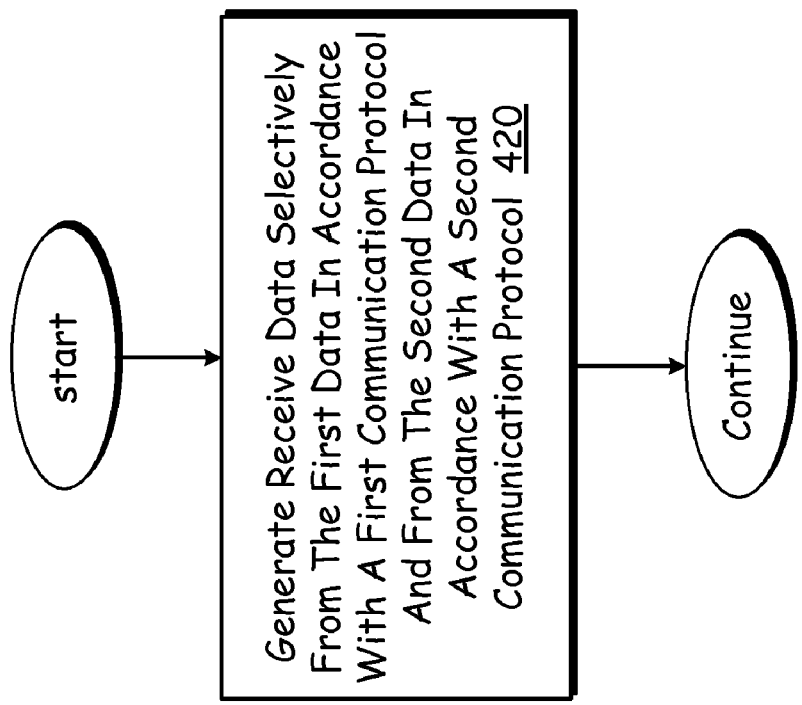
FIG. 13 is a flow chart representation of an embodiment of a method in accordance with the present invention.

FIG. 13 is a flow chart representation of an embodiment of a method in accordance with the present invention, In particular, a method is shown for use in conjunction with one or more of the functions and features described in conjunction with FIGS. 1-12. In step 420, receive data is generated selectively from the first data in accordance with a first communication protocol and from the second data in accordance with a second communication protocol. Step 420 can include generating a first portion of the receive data from first data and generating a second portion of the receive data from second data.

Figure 14:
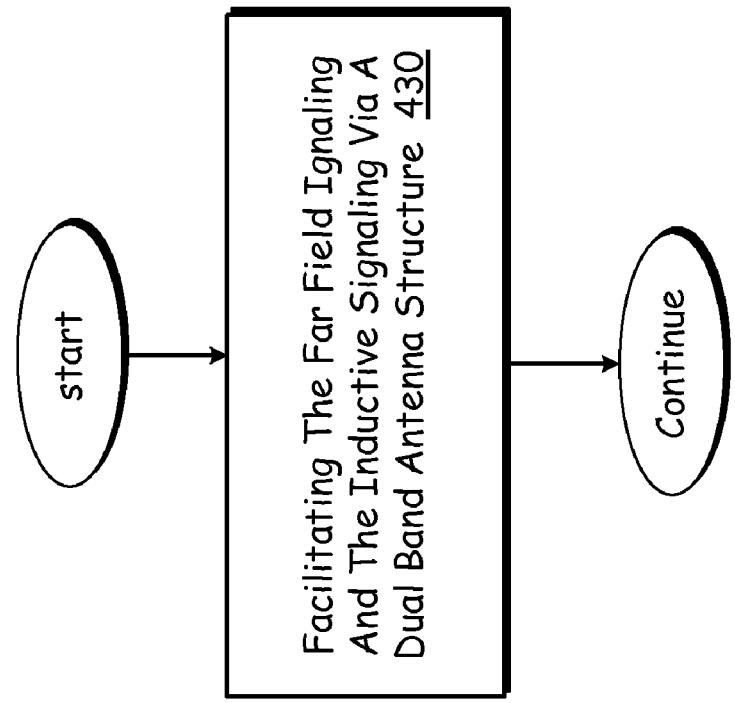
FIG. 14 is a flow chart representation of an embodiment of a method in accordance with the present invention.

FIG. 14 is a flow chart representation of an embodiment of a method in accordance with the present invention. In particular, a method is shown for use in conjunction with one or more of the functions and features described in conjunction with FIGS. 1-13. In step 430, far field signaling and near field signaling are facilitated via a dual band antenna structure.

Figure 15:
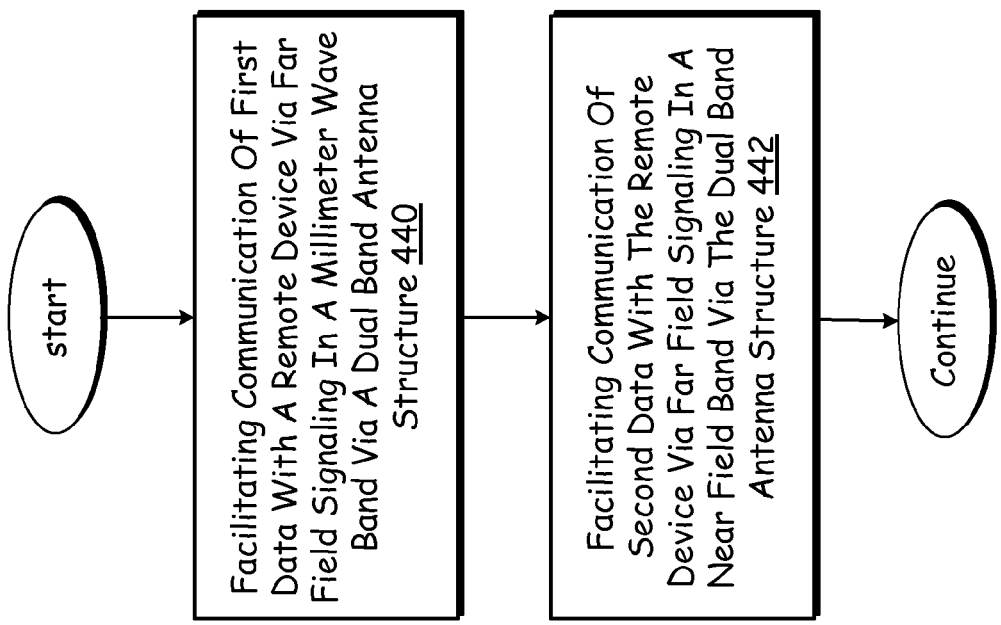
FIG. 15 is a flow chart representation of an embodiment of a method in accordance with the present invention.

FIG. 15 is a flow chart representation of an embodiment of a method in accordance with the present invention. In particular, a method is shown for use in conjunction with one or more of the functions and features described in conjunction with FIGS. 1-14. In step 440, communication of first data is facilitated with a remote device via far field signaling in a millimeter wave band via a dual band antenna structure. In step 442, communication of second data is facilitated with the remote device via near field signaling in a near field band via the dual band antenna structure. The near field band can includes one of: a 900 MHz frequency band, and a 13.5 MHz frequency band. The millimeter wave band can include a 60 GHz frequency band.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The invention claimed is:

1. A dual band antenna comprising:
    a far field antenna structure for facilitating the communication of first data with a remote device via far field signaling in a millimeter wave frequency band;
    a near field antenna structure for facilitating the communication of second data with a remote device via near field signaling in a high frequency (HF) band, wherein the near field antenna structure includes a coil having at least one turn;
    wherein the far field antenna structure and the near field antenna structure share at least one common antenna element and wherein the at least one common antenna element includes a first portion of the coil.

2. The dual band antenna of claim 1 wherein the near field signaling is in a 13.5 MHz frequency band.

3. The dual band antenna of claim 1 wherein the far field antenna structure includes a monopole antenna and the first portion of the coil forms an element of the monopole antenna.

4. The dual band antenna of claim 1 wherein the coil further includes at least one inductive element that isolates the first portion of the coil from a remainder of the coil at the millimeter wave frequency band.

5. The dual band antenna of claim 1 wherein the coil further includes a plurality of inductive elements that isolate the first portion of the coil from a remainder of the coil at the millimeter wave frequency band.

6. The dual band antenna of claim 1 wherein the at least one common antenna element further includes a second portion of the coil.

7. The dual band antenna of claim 6 wherein the far field antenna structure includes a dipole antenna and the first portion of the coil and the second portion of the coil form elements of the dipole antenna.

8. The dual band antenna of claim 6 wherein the coil further includes a plurality of inductive elements that isolate the first portion of the coil and the second portion of the coil from a remainder of the coil at the millimeter wave frequency band.

9. A dual band antenna comprising:
    a far field antenna structure for facilitating the communication of first data with a remote device via far field signaling in a millimeter wave frequency band;
    a near field antenna structure for facilitating the communication of second data with a remote device via near field signaling in a high frequency (HF) band;
    wherein the far field antenna structure and the near field antenna structure share at least one common antenna element;
    wherein the near field antenna structure includes a coil having at least one turn and wherein at least one common antenna element includes a first portion of the coil, and
    wherein the coil further includes at least one inductive element that isolates the first portion of the coil from a remainder of the coil at the millimeter wave frequency band and that conducts in the HF band.

10. The dual band antenna of claim 9 wherein the near field signaling is in a 13.5 MHz frequency band.

11. The dual band antenna of claim 9 wherein the far field antenna structure includes a monopole antenna and the first portion of the coil forms an element of the monopole antenna.

12. The dual band antenna of claim 9 wherein the coil further includes a plurality of inductive elements that isolate the first portion of the coil from a remainder of the coil at the millimeter wave frequency band.

13. The dual band antenna of claim 9 wherein the at least one common antenna element further includes a second portion of the coil.

14. The dual band antenna of claim 13 wherein the far field antenna structure includes a dipole antenna and the first portion of the coil and the second portion of the coil form elements of the dipole antenna.

15. The dual band antenna of claim 13 wherein the coil further includes a plurality of inductive elements that isolate the first portion of the coil and the second portion of the coil from a remainder of the coil at the millimeter wave frequency band.

16. A method comprising:
  facilitating communication of first data with a remote device via far field signaling in a millimeter wave frequency band via a dual band antenna structure; and
  facilitating the communication of second data with the remote device via near field signaling in a high frequency (HF) band via the dual band antenna structure.

17. The method of claim 16 wherein the signaling is in a 13.5 MHz frequency band.

18. The method of claim 16 wherein the millimeter wave frequency band includes a 60 GHz frequency band and, wherein the dual band antenna structure includes a far field antenna structure and a near field antenna structure having a coil, and wherein the far field antenna structure and the near field antenna structure share at least one common antenna element that includes a first portion of the coil.

* * * * *